United States Patent [19]

Demeter et al.

[11] Patent Number: 4,928,051
[45] Date of Patent: May 22, 1990

[54] ELECTRIC MOTOR

[76] Inventors: Jozsef Demeter, 2a Avenida Los Palos Grandes, Ed. Jacaranda, Apto. 3-A, Caracas, Venezuela; Tibor Zoltai, 476 Summit Ave., Saint Paul, Minn. 55102; Hector D. Navarro, Apdo. 47411, Caracas 1041-A, Venezuela

[21] Appl. No.: 298,762

[22] Filed: Jan. 13, 1989

Related U.S. Application Data

[63] Continuation of Ser. No. 46,849, May 5, 1987, abandoned.

[51] Int. Cl.$^5$ ............................................. H02P 5/40
[52] U.S. Cl. .................................... 318/731; 318/820; 318/773
[58] Field of Search ............... 318/731, 732, 721, 722, 318/723, 818–820, 773–776; 310/184, 198, 185, 187, 210, 68 R; 363/150, 151

[56] References Cited

U.S. PATENT DOCUMENTS

| | | | |
|---|---|---|---|
| 3,586,942 | 6/1971 | McMahan | 310/156 |
| 3,860,843 | 1/1975 | Kawasaki et al. | 310/156 |
| 4,039,909 | 8/1977 | Baker | 318/732 |
| 4,218,646 | 8/1980 | Akamatsu | 318/800 |
| 4,707,650 | 11/1987 | Bose | 318/696 |

OTHER PUBLICATIONS

Gottlieb, I. M., *Electric Motors & Electronic Motor Control Techniques*, H. W. Sams & Co., 1976, pp. 96–101.

*Primary Examiner*—David Smith, Jr.
*Attorney, Agent, or Firm*—Peter K. Kontler

[57] ABSTRACT

An electric motor has a rotor and a stator each of which is provided with a polyphase winding. The rotor and stator have the same number of poles but the number of phases in the winding of the rotor differs from that in the winding of the stator. The motor can operate as a stepping motor by deenergizing one of the phases of one winding while simultaneously energizing one of the phases of the other winding, and the motor advances one step whenever one phase of a winding is deenergized and, at the same time, one phase of the other winding is energized. The deenergizing and energizing steps are performed alternately for each winding. The motor can further operate as a synchronous motor by accelerating the motor, discontinuing the deenergizing and energizing steps for one of the windings while maintaining the excitation of such winding and, simultaneously with the discontinuing step, reducing the frequency of the deenergizing and energizing steps for the other winding. The motor can also operate as an induction motor by accelerating the motor and then short-circuiting one of the windings.

5 Claims, 8 Drawing Sheets

| Step | A | B | C | D | E | F | G |
|------|---|---|---|---|---|---|---|
| 0  | − | − | + | ✕ | + | − | − |
| 1  | ✕ | − | + | − | + | − | − |
| 2  | + | − | + | − | + | ✕ | − |
| 3  | + | − | ✕ | − | + | + | − |
| 4  | + | − | − | − | ✕ | + | − |
| 5  | + | ✕ | − | − | − | + | − |
| 6  | + | + | − | − | − | + | ✕ |
| 7  | ✕ | + | − | − | − | + | + |
| 8  | − | + | − | ✕ | − | + | + |
| 9  | − | + | ✕ | + | − | + | + |
| 10 | − | + | + | + | − | ✕ | + |
| 11 | − | ✕ | + | + | − | − | + |
| 12 | − | − | + | + | ✕ | − | + |
| 13 | ✕ | − | + | + | + | − | + |
| 14 | + | − | + | + | + | − | ✕ |
| 15 | + | − | ✕ | + | + | − | − |

ELECTRIC MOTOR

This application is a continuation of application Ser. No. 046,849, filed 5/5/1987, now abandoned.

BACKGROUND OF THE INVENTION

The invention relates generally to an electric motor.

More particularly, the invention relates to an electric motor having a rotor and a stator both of which are provided with polyphase windings.

Various types of electric motors having polyphase windings in the rotor and stator are known. One such type of motor is the stepping motor. These motors have a wide range of applications in electromechanical systems where the position of the rotor, as well as a load being moved by the rotor, is regulated by a digital control system or computer.

The known stepping motors have a low nominal output torque which decreases rapidly with speed. Consequently, their use is limited to applications, such as line printers, requiring low torque. However, in certain applications, such as elevators, cranes and machine tools, precise positioning of heavy loads is required.

OBJECTS AND SUMMARY OF THE INVENTION

It is an object of the invention to provide an electric motor which is capable of operating as a stepping motor but is nevertheless able to generate a relatively high torque.

Another object of the invention is to provide an electric motor which is capable of operating as a stepping motor or relatively high resolution, i.e., a stepping motor having a relatively large number of steps per revolution.

An additional object of the invention is to provide an electric motor which is capable of operating as a stepping motor, a variable speed induction motor or a variable speed synchronous motor.

A further object of the invention is to provide a method which makes it possible to operate an electric motor as a stepping motor of relatively high torque.

It is also an object of the invention to provide a method which enables an electric motor to operate as a stepping motor of relatively high resolution.

Yet another object of the invention is to provide a method which allows an electric motor to be operated as a stepping motor, a variable speed induction motor or a variable speed synchronous motor.

The preceding objects, as well as others which will become apparent as the description proceeds, are achieved by the invention.

One aspect of the invention resides in an electric motor comprising a rotor and a stator. The rotor includes a first polyphase winding having a first number of phases while the stator includes a second polyphase winding having a different second number of phases. The rotor and stator have the same number of poles.

By designing the motor so that the number of phases in the rotor and stator are different, relatively high torque may be achieved. In fact, the motor according to the invention is capable of delivering nominal power and torque comparable to the nominal power and torque of conventional induction or synchronous motors having the same dimensions and the same number of poles.

The motor of the invention may operate as a stepping motor by alternately interrupting the supply of current to one phase of one winding while simultaneously energizing one phase of the other winding. The resolution of the motor, that is, the number of steps per revolution of the rotor, is a function of the number of poles as well as the numbers of phases. Relatively high resolutions, i.e., resolutions in excess of 200 steps per revolution, may be obtained by appropriate selection of the number of poles and the numbers of phases.

The motor advances one step whenever one phase of one winding is deenergized while, at the same time, one phase of the other winding is energized. When a given phase is again energized following deenergization, the polarity of the current in such phase subsequent to deenergization is the opposite of that prior to deenergization. Thus, as the motor advances through a series of steps, the polarities of the currents in the various phases are reversed at intervals.

The motor according to the invention may be made to operate as a variable speed synchronous motor by increasing the frequency of the deenergizing and energizing steps to a predetermined value and thereafter fixing the number of phases in one winding by discontinuing the deenergizing step for such winding while simultaneously reducing the frequency of the deenergizing and energizing steps for the other winding.

The motor in accordance with the invention may further be operated as a variable speed induction motor by short-circuiting one of the windings once the rotor has achieved a predetermined rotational speed.

The number of phases in the rotor and stator may differ by one or by more than one. However, it is preferred for the number of phases to differ by one since the motor then operates most efficiently. Either the rotor or the stator may have the larger number of phases.

Another aspect of the invention resides in a method of operating an electric motor having a rotor and a stator. The method comprises the steps of supplying the rotor with a first polyphase current having a first maximum number of phases, and supplying the stator with a second polyphase current having a second maximum number of phases different from the maximum number of phases of the first current. The supplying steps induce rotation of the rotor.

The supplying steps are preferably performed in such a manner that the maximum number of phases of the first current differs from that of the second current by one.

The currents supplied to the rotor and stator may be alternating or time-varying currents, and the supplying steps may then be carried out so that the ratio of the frequency of the first current to the frequency of the second current is inversely proportional to the ratio of the maximum number of phases of the first current to the maximum number of phases of the second current.

The method allows the motor to be operated as a stepping motor. When the motor is to operate as a stepping motor, the method includes the steps of decreasing the number of phases of the first current while simultaneously increasing the number of phases of the second current, and decreasing the number of phases of the second current while simultaneously increasing the number of phases of the first current. The rotor rotates through a predetermined angle, i.e., the motor advances one step, whenever the number of phases of one current is decreased and, at the same time, the number of phases of the other current is increased. Advantageously, each decrease and increase in the number of phases equals one. The steps of decreasing the number of phases and increasing the number of phases may be repeated alternately for each current to thereby move the rotor through an angle of the desired magnitude in steps.

A decrease in the number of phases of a current may involve temporarily interrupting or discontinuing a given phase while an increase in the number of phases may involve reestablishing the phase. Preferably, the different phases of each current are interrupted and reestablished in turn.

The method may comprise the additional steps of changing the polarities of the phases of the first current, and changing the polarities of the phases of the second current. When the motor performs a sufficiently large number or steps, each phase may undergo more than one change in polarity. It is preferred for a change in polarity to take place directly after an interruption so that the polarity of a phase immediately prior to interruption of the phase is different from the polarity of the phase immediately following the interruption.

The method also permits the motor to be operated as a variable speed synchronous motor. To this end, the method may include the steps of increasing the frequency of the phase decreasing and phase increasing steps to a first frequency, fixing the number and polarities of the phases of one of the currents by discontinuing the phase decreasing, phase increasing and polarity changing steps for such current, and reducing the frequency of the phase decreasing and phase increasing steps for the other current from the first frequency to a second frequency. The motor may operate as a variable speed synchronous motor when the frequency of the phase decreasing and phase increasing steps for the latter current reaches the second frequency. The first frequency may be one which is characteristic of the motor while the second frequency may be equal to the first frequency divided by the maximum number of phases of the current with the fixed phases. Preferably, the fixing and reducing steps are performed simultaneously.

The step of increasing the frequency of the phase decreasing and phase increasing steps to the first frequency results in an initial acceleration of the rotor. The rotor may be additionally accelerated by increasing the frequency of the phase decreasing and phase increasing steps for the current with the variable phases from the second frequency to a third frequency. This last frequency may be a nominal frequency.

The motor may be returned to a condition in which it may again operate as a stepping motor by decreasing the frequency of the phase decreasing and phase increasing steps for the current with the variable phases from the third frequency to the second frequency, reestablishing variations in the number and polarities of the previously fixed phases by restarting the phase decreasing, phase increasing and polarity changing steps for the current with the fixed phases, and raising the frequency of the phase decreasing and phase increasing steps for the current having the second frequency to the first frequency. The raising step and the step or reestablishing variations are preferably performed simultaneously.

The step of decreasing the frequency of the phase decreasing and phase increasing steps from the third frequency to the second frequency permits a deceleration of the rotor to be achieved.

The method further allows the motor to be operated as a variable speed induction motor. This may be accomplished by increasing the frequency of the phase decreasing and phase increasing steps to a predetermined frequency to thereby accelerate the rotor to a predetermined rotational speed, and short-circuiting the windings in either the rotor or the stator upon interruption of the operation of the corresponding inverter. The motor may operate as an induction motor upon such interruption.

The method may additionally comprise the step of maintaining the voltages of the currents proportional to the rotational speed of the rotor. This enables the motor to more readily develop and maintain torque.

The novel features which are considered as characteristic of the invention are set forth in particular in the appended claims. The improved electric motor itself, however, both as to its construction and the mode of operating the same, will be best understood upon perusal of the following detailed description of certain specific embodiments when read in conjunction with the accompanying drawings.

DESCRIPTION OF THE PREFERRED EMBODIMENTS

Figure 1:
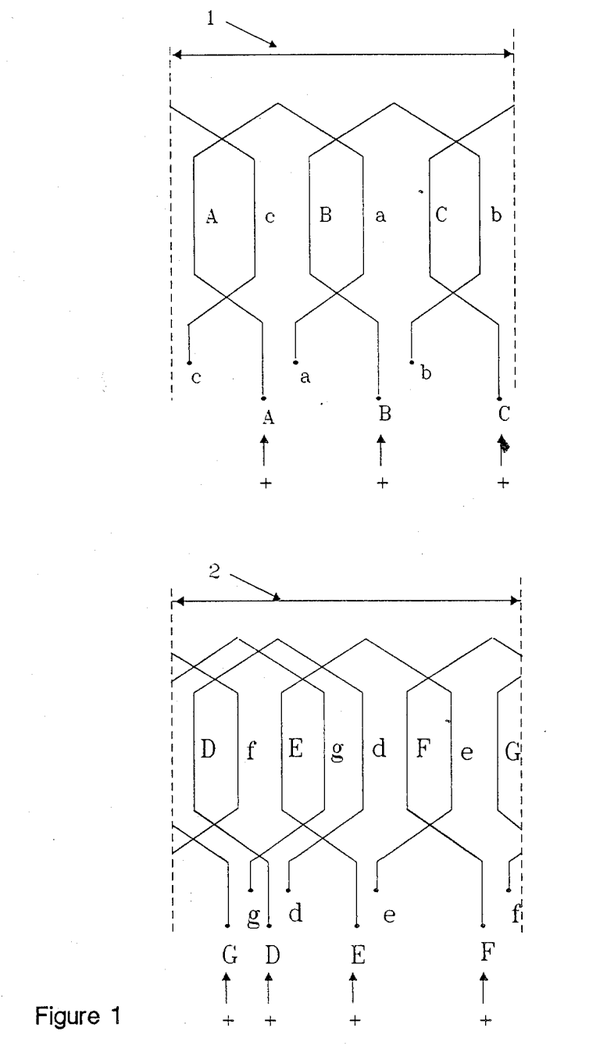
FIG. 1 schematically illustrates the windings of a rotor and a stator constituting part of a first motor according to the invention.

FIG. 1 schematically illustrates a rotor 1 and a stator 2 of an electric motor in accordance with the invention. As in conventional, the rotor 1 defines a first set of magnetic poles while the stator 2 defines a second set of magnetic poles. The number of poles on the rotor 1 equals the number of poles on the stator 2.

The rotor 1 and stator 2 each include a polyphase winding and, according to the invention, the number of phases in the winding of the rotor 1 differs from the number of phases in the winding of the stator 2. It is immaterial as to whether the rotor 1 or the stator 2 has the greater number of phases. In the illustrated embodiment, the winding of the rotor 1 has three phases A-a, B-b, C-c whereas the winding of the stator 2 has four phases D-d, E-e, F-f, G-g.

The numbers of phases in the rotor 1 and stator 2 may be different from those shown. Thus, by way of example, the rotor 1 may have four phases and the stator 2 may have five phases. Furthermore, although the motor operates most efficiently when the number of phases in the rotor 1 differs from the number of phases in the stator 2 by one, the number of phases n the rotor 1 may differ from the number of phases in the stator 2 by more than one.

As is conventional, the rotor 1 is provided with a series of slots for the coils A,a,B,b,C,c of the phases A-a, B-b, C-c. Each slot receives at least a portion of a respective coil A,a,B,b,C,c and, depending upon the manner in which the rotor 1 is wound, may receive portions of more than one coil A,a,B,b,C,c. Similarly, the stator 2 is formed with a series of slots for the coils D,e,E,d,F,s,G,f of the phases D-d, E-e, F-f, G-g. Again, each slot of the stator 2 receives at least a portion of a respective coil D,d,E,e,F,f,G,g and, depending upon the manner in which the stator 2 is wound, may receive portions of more than one coil D,d,E,e,F,f,G,g.

The winding of the rotor 1 is supplied with an alternating or time-varying polyphase current having a maximum number of phases equal to the number of phases in the rotor 1. Thus, since the rotor 1 has three phases, the winding of the rotor 1 is supplied with a 3-phase current. To this end, the winding of the rotor 1 is connected with a voltage source of variable voltage and frequency.

Figure 2A:
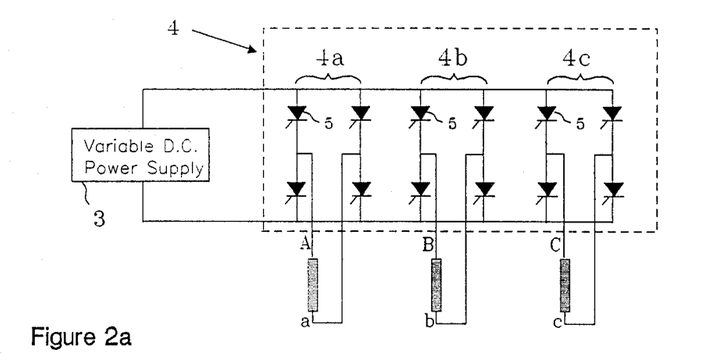
FIG. 2a shows a voltage source for the rotor of FIG. 1.

Referring to FIG. 2a, the voltage source for the winding of the rotor 1 includes a variable d.c. power supply 3 and an inverter 4 which receives pulses from a pulse source of variable frequency. The inverter 4 comprises a number of phases equal to the number of phases in the rotor 1, and the phases of the inverter 4 are identified by the reference numerals 4a,4b,4c, respectively. The phase 4a of the inverter 4 corresponds to the phase A-a of the rotor 1; the phase 4b of the inverter 4 corresponds to the phase B-b of the rotor 1; and the phase 4c of the inverter 4 corresponds to the phase C-c of the rotor 1. Each of the phases 4a,4b,4c of the inverter 4 is made up of several primary commutating elements 5 as well as auxiliary commutating elements which have not been illustrated to preserve clarity. The commutating elements may be in the form of silicon-controlled rectifiers, e.g., GTOs which can be turned off by an inverted signal applied to the gate terminal.

The winding of the stator 2 is supplied with an alternating of time-varying polyphase current having a maximum number of phases equal to the number of phases in the stator 2. Thus, inasmuch as the stator 2 has four phases, the winding of the stator 2 is supplied with a 4-phase current. Current is delivered to the winding of the stator 2 by a voltage source of variable voltage and frequency.

Figure 2B:
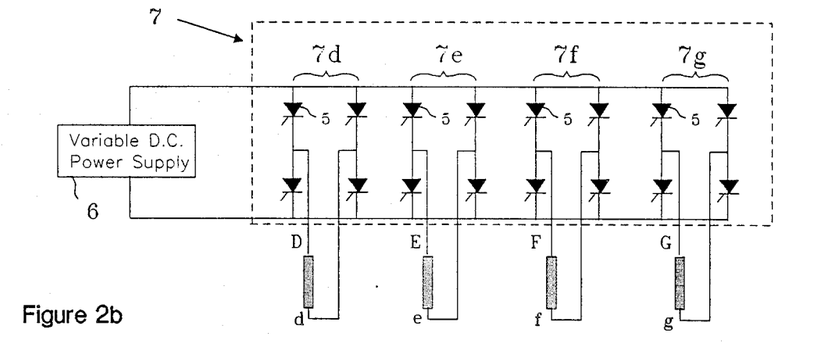
FIG. 2b shows a voltage source for the stator of FIG. 1.

As shown in FIG. 2b, the voltage source for the winding of the stator 2 includes a variable d.c. power supply 6 and an inverter 7 which receives pulses from a pulse source of variable frequency. The inverter 7 comprises a number of phases equal to the number of phases in the stator 2, and the phases of the inverter 7 are identified by the reference numerals 7d,7e,7f,7g, respectively. The phase 7d of the inverter 7 corresponds to the phase D-d of the stator 2; the phase 7e of the inverter 7 corresponds to the phase E-e of the stator 2; the phase 7f of the inverter 7 corresponds to the phase F-f of the stator 2; and the phase 7g of the inverter 7 corresponds to the phase G-g of the stator 2. Each of the phases 7d,7e,7f,7g of the inverter 7 is made up of several primary commutating elements 5 as well as auxiliary commutating elements which have not been illustrated for the sake of clarity. The commutating elements may be in the form of silicon-controlled rectifiers, e.g., GTOs which can be turned off by an inverted signal applied to the gate terminal.

As mentioned above, the inverters 4 and 7 receive pulses from respective pulse sources of variable frequency. These pulses establish the frequencies of the alternating or time-varying currents delivered by the inverters 4 and 7. The pulse sources are regulated in such a manner as to satisfy the following relationship:

$$f_1/f_2 = m_2/m_1 \qquad (1)$$

where:

$f_1$ is the frequency of the current delivered to the rotor 1;

$f_2$ is the frequency of the current delivered to the stator 2;

$m_1$ is the number of phases of the rotor 1; and $m_2$ is the number of phases of the stator 2.

Equation 1 states that the ratio of the frequencies of the currents delivered to the rotor 1 and stator 2 is constant for a particular motor and inversely proportional to the ratio of the numbers of phases in the rotor 1 and stator 2.

The d.c. power supplies 3 and 6 may be replaced by respective alternating or time-varying polyphase power supplies of variable voltage and frequency. The inverters 4 and 7 may then be eliminated. The polyphase power supplies, which should be synchronized, are again regulated so as to satisfy Equation 1.

In FIG. 1, the "+" symbols represent the positive sense of the currents in the phases A-a, B-b, C-c, D-d, E-e, F-f, G-g.

OPERATION OF THE MOTOR AS A STEPPING MOTOR

The motor of the invention is capable of operating as a stepping motor. Operation as a stepping motor will be described for the motor of FIGS. 1 and 2 with reference to FIGS. 3, 4a and 4b.

The motor advances one step when either of the following Operations is performed: (i) one phase of the rotor 1 is disconnected from its voltage source and one phase of the stator 2 is simultaneously connected with its voltage source; or (ii) one phase of the stator 2 is disconnected from its voltage source and one phase of the rotor 1 is simultaneously connected with its voltage source. The motor may be made to advance a predetermined number of steps by alternately performing Operations i and ii until the total number of Operations i and ii equals the number of steps to be advanced. Each of Operations i and ii involves a commutation of the commutating elements of the inverter 4 and an accompanying commutation of the commutating elements of the inverter 7. It may be observed that the commutation frequency of the inverter 4 equals the commutation frequency of the inverter 7.

Figure 3:
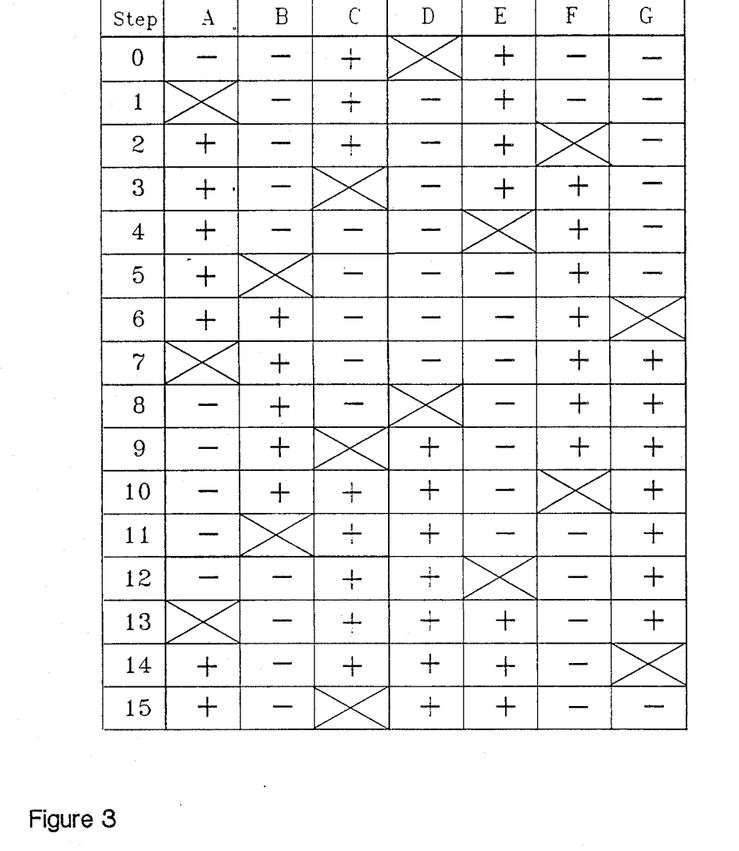
FIG. 3 is a chart depicting the currents in the windings of the rotor and stator of FIG. 1 during operation of the first motor as a stepping motor.

FIG. 3 is a Chart showing how the motor may be advanced fifteen steps from an initial or starting position by alternately performing Operations i and ii. The first column in FIG. 3 denotes the number of steps advanced by the motor with Step 0 representing the initial position. The succeeding seven columns A,B,C,D,E,F,G respectively denote the phases A-a, B-b, C-c of the rotor 1 and the phases D-d, E-e, F-f, G-g of the stator 2. A "+" represents a flow of current through the respective phase in the positive sense indicated by the corresponding "+" in FIG. 1; a "−" represents a flow of current through the respective phase in a sense opposite to the positive sense of FIG. 1; and an "X" represents an absence of current in the respective phase. In each of Steps 0 thru 11, a different combination of excitations exists in the phases A-a, B-b, C-c of the rotor 1. Beginning at Step 12, the pattern of excitations established for the phases A-a, B-b, C-c during Steps 0 thru 11 is repeated. Similarly, a different combination of excitations exists in the phases D-d, E-e, F-f, G-g of the stator 2 in each of Steps 0 thru 15. The pattern established for the phases D-d, E-e, F-f, G-g during steps 0 thru 15 begins to repeat at Step 16.

There are several features of interest in FIG. 3. To begin with, Operation i always reduces the number of energized phases of the rotor 1 and simultaneously increases the number of energized phases of the stator 2. Similarly, Operation ii always reduces the number of energized phases of the stator 2 and, at the same time, increases the number of energized phases of the rotor 1. In the illustrated embodiment, each increase and reduction in the number of energized phases equals one. Since Operations i and ii are performed alternately, reductions in the number of energized phases of the rotor 1 alternate with reductions in the number of energized phases of the stator 2 and, likewise, increases in the number of energized phases of the rotor 1 alternate with increases in the number of energized phases of the stator 2.

Moreover, the different phases A-a, B-b, C-c of the rotor 1 are disconnected from the respective voltage source in turn as are the different phases D-d, E-e, F-f, G-g of the stator 2. Thus, for the rotor 1, deenergization of the phase A-a is followed by deenergization of the phase C-c which, in turn, is followed by deenergization of the phase B-b. For the stator 2, deenergization of the phases follows the sequence D-d, F-f, E-e, G-g. Furthermore, deenergization of a phase is followed by a reversal in polarity of the current in the phase. For example, the phase A-a has a "−" polarity at Step 0, is deenergized at Step 1 and has a "+" polarity at Step 2. The phases A-a, B-b, C-c of the rotor 1 are deenergized and undergo reversals in polarity at regular first intervals while the phases D-d, E-e, F-f, G-g of the stator 2 are deenergized and undergo reversals in polarity at regular second intervals longer than the first intervals.

Figure 4A:
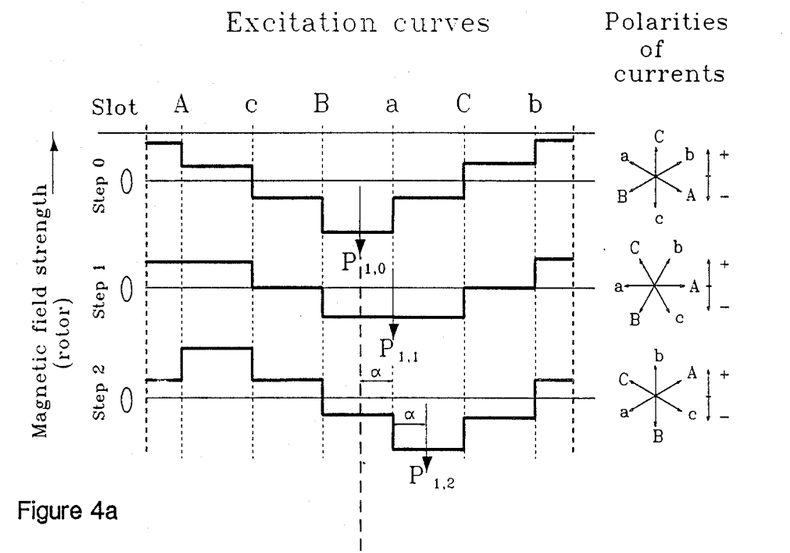
FIG. 4a illustrates excitation curves and corresponding polarity diagrams for the rotor of FIG. 1 during three steps of the first motor.
Figure 4B:
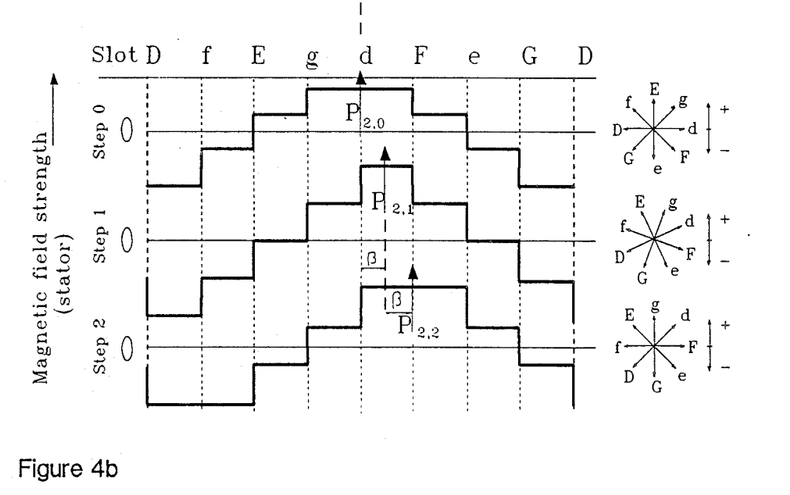
FIG. 4b illustrates excitation curves and corresponding polarity diagrams for the stator of FIG. 1 during the same three steps of the first motor.

FIGS. 4a and 4b illustrate the excitation curves Steps 0, 1 and 2 of FIG. 3 together with corresponding diagrams showing the polarities of the currents in the coils A,a,B,b,C,c,D,d,E,e,F,f,G,g, during each of the Steps 0, 1 and 2. FIG. 4a illustrates the excitation curves and polarity diagrams for the rotor 1 while FIG. 4b illustrates the excitation curves and polarity diagrams for the stator 2.

For the excitation curves, the abscissa represents the slots for the coils A,a,B,b,C,c,D,d,E,e,F,f,G,g whereas the ordinate represents magnetic field strength. The polarity diagrams, which describe each current in terms of a vector and an angle theta between the vector and a horizontal axis, become phasor diagrams of the currents when the motor reaches a predetermined rotational speed.

It will be observed that the sequence in FIG. 4a, i.e., A,c,B,a,C,b, is the same as that for the rotor 1 of FIG. 1. Similarly, the sequence in FIG. 4b is the same as that for the stator 2 of FIG. 1.

In the initial position of the rotor represented by Step 0, the axes of the magnetic poles of the rotor 1 and stator 2 are in alignment. This is indicated by the arrow $P_{1,0}$ in FIG. 4a and the arrow $P_{2,0}$ in FIG. 4b which respectively represent magnetic pole axes of the rotor 1 and stator 2.

If commutation is now induced in the inverters 4 and 7 in order to shift from the condition of Step 0 to the condition of Step 1, the magnetic pole axis $P_{1,0}$ of the rotor 1 moves through an angle alpha to a new position $P_{1,1}$ while the magnetic pole axis $P_{2,0}$ of the stator 2 moves through an angle beta to a new position $P_{2,1}$. The angles alpha and beta are given by the following Equations:

$$\text{alpha} = 90°/\text{number of phases in the rotor 1} \quad (2)$$

$$\text{beta} = 90°/\text{number of phases in the stator 2}. \quad (3)$$

Due to the fact that the number of phases in the rotor 1 differs from the number of phases in the stator 2, the angle alpha is different from the angle beta. This means that the magnetic pole axes $P_{1,1}$ and $P_{2,1}$ are not in alignment so that an attraction is produced between the poles. The attraction causes the rotor 1 to rotate through an angle gamma such that the magnetic pole axis $P_{1,1}$ of the rotor 1 comes into alignment with the magnetic pole axis $P_{2,1}$ of the stator 2. The angular rotation gamma of the rotor 1 is given by the following Equation:

$$\text{gamma} = 2 \times (\text{alpha} - \text{beta})/\text{number of poles on the rotor 1 or stator 2} \quad (4)$$

When a further commutation is induced in the inverters 4 and 7 in order to shift from the condition of Step 1 to the condition of Step 2, the magnetic pole axis $P_{1,1}$ of the rotor 1 moves through the angle alpha to a new position $P_{1,2}$ whereas the magnetic pole axis $P_{2,1}$ of the stator 2 moves through the angle beta to a new position $P_{2,2}$. The magnetic pole axes $P_{1,2}$ and $P_{2,2}$ are again out of alignment thereby causing an additional rotation of the rotor 1 through the angle gamma.

For a particular motor, the angular displacement of the rotor 1 is the same for each step.

The following Table illustrates the effects of the number of phases and the number of poles:

| No. of phases in rotor 1 | Alpha (o) | No. of phases in stator 2 | Beta (o) | No. of poles in rotor 1 and stator 2 | Gamma (o) | No. of steps per revolution (360°/gamma) |
|---|---|---|---|---|---|---|
| 3 | 30 | 4 | 22.5 | 2 | 7.5 | 48 |
| 3 | 30 | 4 | 22.5 | 4 | 3.75 | 96 |
| 3 | 30 | 4 | 22.5 | 6 | 2.5 | 144 |
| 3 | 30 | 4 | 22.5 | 8 | 1.875 | 192 |
| 4 | 22.5 | 5 | 18 | 2 | 4.5 | 80 |
| 4 | 22.5 | 5 | 18 | 4 | 2.25 | 160 |
| 4 | 22.5 | 5 | 18 | 6 | 1.5 | 240 |
| 4 | 22.5 | 5 | 18 | 8 | 1.12 | 320 |

As indicated in the polarity diagrams by the arrows pointing counterclockwise, the phasors representing the currents in the coils A,a,B,b,C,c of the rotor 1 rotate counterclockwise through the angle alpha during each step while the phasors representing the currents in the coils D,d,E,e,F,f,G,g of the stator 2 rotate counterclockwise through the angle beta during each step.

OPERATION OF THE MOTOR AS A SYNCHRONOUS MOTOR

The motor of the invention is further capable of operating as a variable speed synchronous motor. This is particularly useful when several revolutions are required in order to position a load.

Assuming that the motor of FIGS. 1 and 2 is at a standstill and must perform several revolutions to bring a load into position, the motor is initially accelerated by gradually increasing the commutation frequency of the inverters 4 and 7 from zero to a value $f_m$ determined by the characteristics of the motor and of the inverters 4,7. During the initial acceleration, the motor operates as a step motor. Once a commutation frequency of $f_m$ has been achieved, commutation of one of the inverters 4 and 7 is discontinued in such a manner that the excitation in the corresponding winding remains the same as in the last step made. This means that any phases which were deenergized during the last step remain deenergized while any phases which were energized during the last step remain energized and continue to have the same polarities. Thus, upon discontinuing commutation of an inverter 4 or 7, the number and polarities of the phases of the corresponding winding are fixed. It is immaterial as to whether commutation is discontinued for the inverter 4 associated with the rotor 1 or for the inverter 7 associated with the stator 2.

At the same time that commutation of one of the inverters 4,7 is discontinued, the commutation frequency of the other inverter 7,4 is reduced to a value $f_s$ defined as follows:

$$f_2 = f_m/m \quad (5)$$

where:

m is the number of phases of the non-commutating inverter 7 or 4 and its associated winding.

Upon reduction of the commutation frequency to $f_s$, the motor continues to operate at the same rotational speed as before the reduction but now as a variable speed synchronous motor. The rotational speed at this time is less than the normal speed. Acceleration to nominal speed may be achieved by increasing the commutation frequency of the commutating inverter 4 or 7 from $f_s$ to nominal frequency $f_n$.

The sequence of operations by which the motor was accelerated to nominal speed is reversed when the motor is to be decelerated. Thus, to begin with, the commutation frequency of the commutating inverter 4 or 7 is gradually reduced from $f_n$ to $f_s$. This results in an initial deceleration of the motor. Once the commutation frequency of the commutating inverter 4 or 7 has returned to $f_s$, commutation of the non-commutating inverter 7 or 4 is restarted at a frequency of $f_m$. Simultaneously, the commutation frequency of the other inverter 4 or 7 is increased from $f_s$ to $f_m$. From this time on, the motor again operates as a step motor, and the load can be properly positioned by controlling the commutation, i.e., by controlling the commutation frequency and the number of steps. The motor will operate as a step motor over the entire range of commutation frequency from $f_m$ to 0.

OPERATION OF THE MOTOR AS AN INDUCTION MOTOR

The motor of the invention is also capable of operating as a variable speed induction motor.

Operation of the motor as an induction motor is accomplished by first accelerating the motor to a predetermined rotational speed while the motor operates as a step motor. This is similar to the initial acceleration imparted to the motor when the motor is to operate as a synchronous motor. However, after discontinuing commutation of one of the inverters 4,7 as is done for operation as a synchronous motor, the corresponding windings are short-circuited once the motor has reached the predetermined rotational speed so that the flow of current from the inverter to the associated winding of the rotor 1 or stator 2 is interrupted. The motor then operates as a variable speed induction motor. A closed loop control system may be required to operate the motor as an induction motor.

All of the known braking methods for reducing the speed of induction motors and synchronous motors, e.g., inverse current braking, may be employed for the motor of the invention.

As indicated above, the motor according to the invention may operate as a variable speed motor. This is of particular advantage when the required speed is very low such as, for example 100 rpm or less. Thus, in order to operate at low speeds, conventional motors must be constructed with a large number of poles, i.e., 72 poles or more on each of the rotor and stator. In contrast, a motor constructed in accordance with the invention and having only two poles on each of the rotor 1 and stator 2 can operate from 0 to 100 rpm with a constant torque corresponding to the nominal torque of the motor.

When the motor of the invention operates as a step motor, a non-uniform current distribution exists in the windings of the rotor 1 and stator 2 during the different steps. Due to this non-uniform current distribution, the excitation curves of FIGS. 4a and 4b have a certain degree of deformation which, in turn, causes a non-uniform displacement of the magnetic axes of the rotor 1 and stator 2 for the different steps. The resulting difference between the calculated and actual angles of rotation of the rotor 1 during each step is not cumulative and can be tolerated for most of the applications of step motors.

The error in the angle of rotation may be reduced by providing the rotor 1 and stator 2 with the same number of slots. The reluctance of the motor then becomes uniform for all steps. By forming the rotor 1 and stator 2 with the same number of slots, the number of slots per pole per phase will be different for the rotor 1 and stator 2.

In certain cases, the error in the angle of rotation may be reduced by the use of dampers.

Figure 5A:
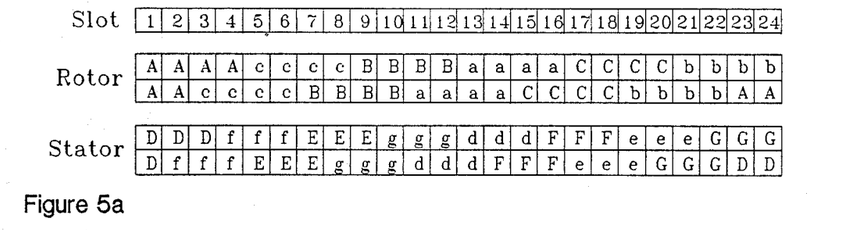
FIG. 5a diagrammatically illustrates the windings of a rotor and a stator constituting part of a second motor in accordance with the invention.

The error in the angle of rotation may be further reduced by constructing the rotor 1 and stator 2 with double-layer windings and an integral number of slots per pole per phase. FIGS. 5a diagrammatically illustrates such a motor. The motor of FIG. 5a has the following winding specifications:

|  | Rotor double-layer, integral-slot winding; former-wound, shorted coils | Stator double-layer, integral-slot winding; former-wound, shorted coils |
| --- | --- | --- |
| Number of phases: | 3 | 4 |
| Number of slots per pole: | 12 | 12 |
| Number of slots per pole per phase | 4 | 3 |
| Coil span in terms of number of slots: | 10 | 10 |

The three phases of the rotor of FIG. 5a are, as before, denoted by A-a, B-b, C-c. Similarly, the four phases of the stator of FIG. 5a are again identified as D-d, E-e, F-f, G-g.

The rotor and stator of the motor of FIG. 5a each have two poles and 24 slots. FIG. 5a shows the distribution of the phases A-a, B-b, C-c, D-d, E-e, F-f, G-g or, alternatively, the coils A,a,B,b,C,c,D,d,E,e,F,f,G,g of the latter, among the slots. Since the windings of the rotor and stator are double-layer windings, each slot accommodates a double layer of coils including an upper layer and a lower layer. For instance, slot number 8 of the rotor accommodates a portion of coil c and a portion of coil B with coil c constituting the upper layer and coil B the lower layer. Slot number 8 of the stator, on the other hand, has an upper layer formed by a portion of coil E and a lower layer formed by a portion of coil g.

Figure 5B:
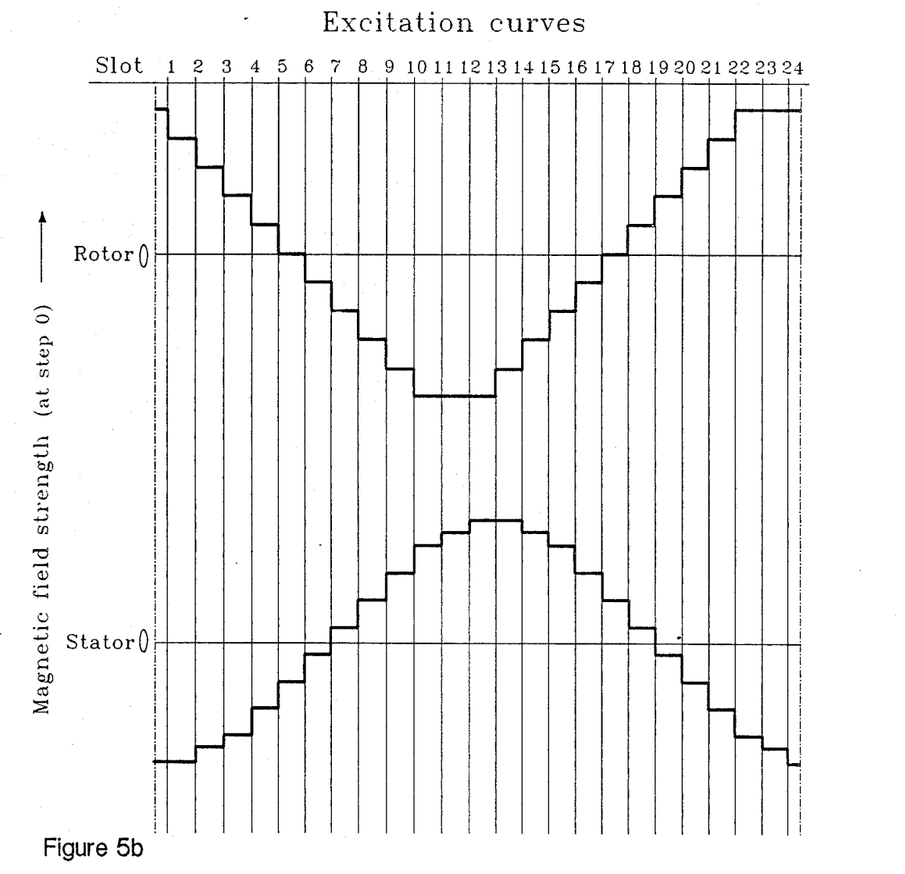
FIG. 5b illustrates excitation curves for the rotor and stator of FIG. 5a during one step of the second motor when the latter operates as a stepping motor.
Figure 5C:
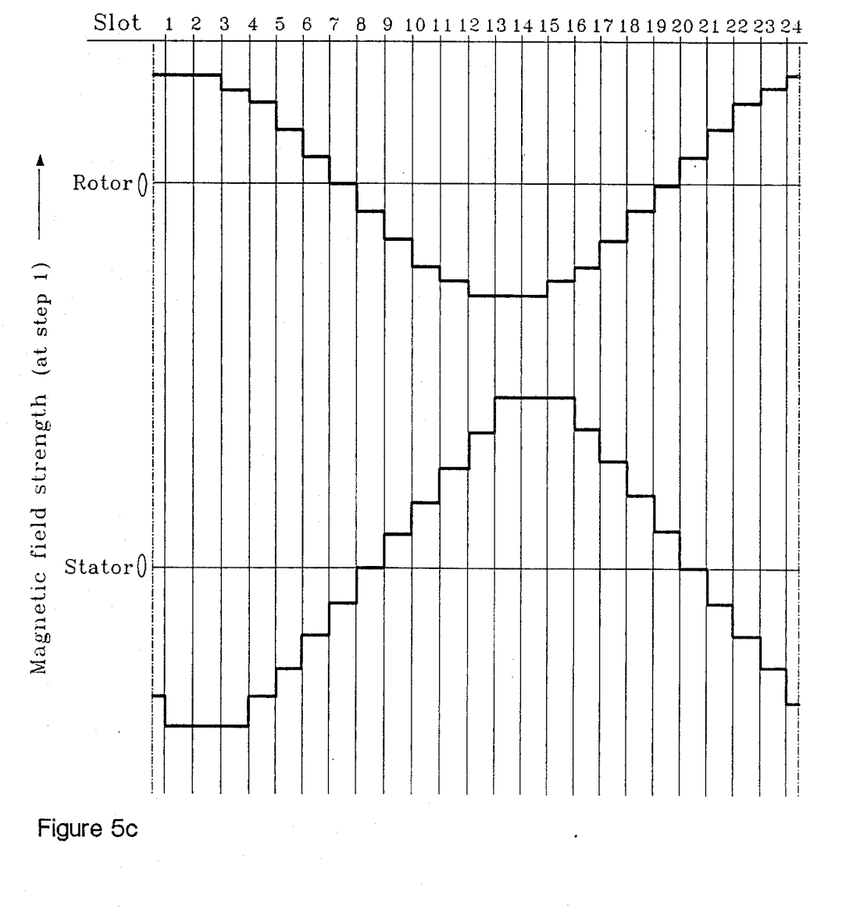
FIG. 5c illustrates excitation curves for the rotor and stator of FIG. 5a during another step of the second motor.

FIG. 5b shows excitation curves for the rotor and stator of FIG. 5a when the motor including the rotor and stator is in an initial position which, as before, is denoted as Step 0. FIG. 5c shows the excitation curves after the motor has advanced one step from Step 0 to Step 1. After Step 1, the excitation curves repeat.

An important application of the motor according to the invention is to drive a load through a given distance at a predetermined speed. For the reasons to be outlined below, a suitable control system, e.g., a microprocessor-based system, is preferably employed for such application.

Assume that the motor is to drive a load which generates a torque $M_L$. In order to accelerate the load from an initial angular or rotational speed of zero to a certain operating speed $w_m$, it is necessary for the motor to generate a torque $M_M$ greater than the torque $M_L$ of the load. This defines a dynamic torque $M_D$ as follows:

$$M_D = M_M - M_L. \quad (6)$$

The dynamic torque $M_D$ is related to the angular acceleration dw/dt and the moment of inertia $J_L$ of the load by the following equation:

$$M_D = J_L \cdot (dw/dt) \quad (7)$$

where:
w is the angular velocity of the load, and
t is time.
It follows from Equation 7 that the dynamic torque $M_D$ is constant when the angular acceleration dw/dt is constant.

The torque $M_M$ of the motor is a function of the currents circulating through the windings of the rotor and stator and each of these currents is, in turn, a function of the reactance or impedance of the respective winding and of the voltage of the respective power supply. Since the reactance or impedance of a winding is proportional to the commutation frequency of the associated inverter, the windings should be energized by power supplies which can be controlled in order to compensate for the dependence of the reactance or impedance on the commutation frequency.

To maintain the torque $M_M$ of the motor, the voltage of a power supply should be proportional to the angular velocity of the motor which, in turn, is proportional to the commutation frequency of the inverters. Furthermore, when the motor has zero angular velocity, the voltage of a power supply should be sufficient to generate a holding torque.

In view of the above, it is desirable to operate the motor via an appropriate control system when the motor is to drive a load through a given distance at a predetermined speed. A suitable control system is schematically illustrated in FIG. 6.

Figure 6:
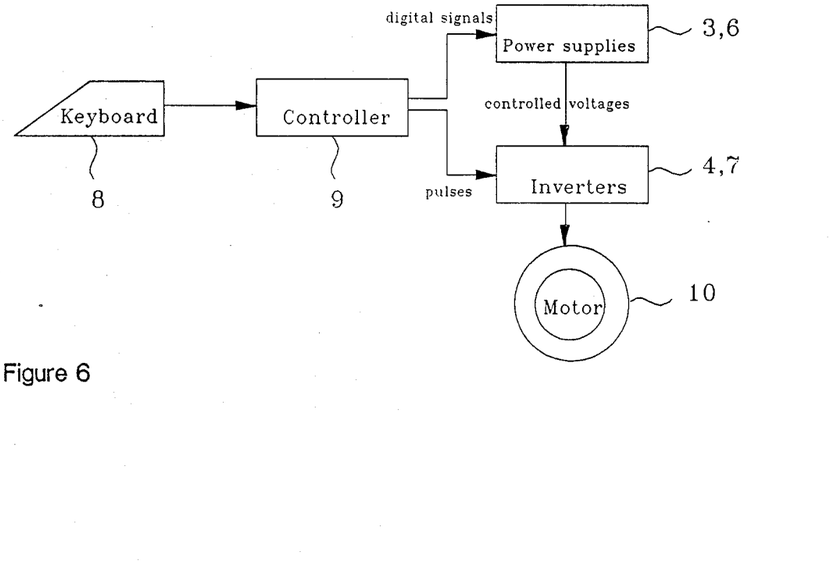
FIG. 6 shows a control system for a motor according to the invention.

The control system of FIG. 6 includes a keyboard 8 which allows data such as the required dynamic torque of a motor 10 to be manually introduced into a controller 9. The keyboard 8 may be replaced by a mainframe computer which automatically feeds data into the controller 9 if the motor 10 is regulated by such a computer as part of a system. The controller 9 is connected to the inverters 4,7 and supplies the latter with pulses at a frequency determined by the inputs to the controller 9. The pulse frequency establishes the commutation frequency of the inverters 4,7. The controller 9 is further connected to the power supplies 3,6 which, in turn, are connected to the respective inverters 4,7. The inverters 4,7 are respectively connected to the rotor and stator of the motor 10. The controller 9 provides the power supplies 3,6 with digital signals which are proportional to the commutation frequency of the inverters 4,7, and hence to the angular velocity of the motor 10. These digital signals cause the power supplies 3,6 to provide the inverters 4,7 with controlled voltages proportional to the angular velocity of the motor 10.

Figure 7:
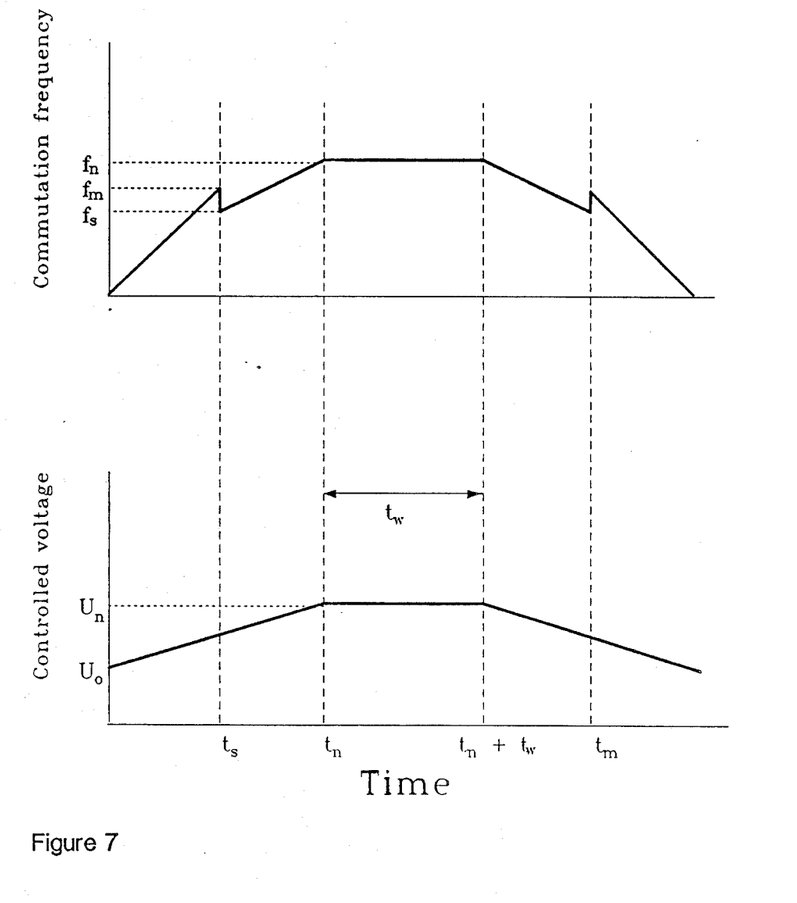
FIG. 7 shows frequency and voltage curves generated by the control system of FIG. 6 during operation of a motor as a stepping motor and a synchronous motor.

FIG. 7 shows plots of commutation frequency versus time and controlled voltage versus time for operation of the motor 10 of FIG. 6 as a synchronous motor. At time zero, the motor 10 is assumed to be at a standstill and the commutation frequency of the inverters 4,7 is zero. The power supplies 3,6, however, generate a certain voltage $U_o$ which is sufficiently large to allow the motor 10 to produce a holding torque.

Between time zero and time $t_s$, the commutation frequency of the inverters 4,7 is gradually increased to the value $f_m$ which, as explained previously, depends upon the characteristics of the motor 10 and the inverters 4,7. The increase in commutation frequency to $f_m$ results in an initial acceleration of the motor 10. During the period from time zero to time $t_s$, the motor 10 operates as a stepping motor.

When the commutation frequency reaches $f_m$, commutation of one of the inverters 4,7 is discontinued while maintaining the existing excitation thereof and the commutation frequency of the other inverter 7,4 is simultaneously reduced to the value $f_s$ defined by Equation 5. The operations of discontinuing commutation of one of the inverters 4,7 and reducing the commutation frequency of the other inverter 7,4 are carried out at time $t_s$. The motor 10 now begins to operate as a synchronous motor. The angular velocity of the motor 10 remains unchanged upon reduction of the commutation frequency from $f_m$ to $f_s$.

Between time $t_s$ and $t_n$, the commutation frequency of the commutating inverter 4 or 7 is gradually increased from $f_s$ to the nominal frequency $f_n$. The nominal frequency $f_n$ exceeds the characteristic frequency $f_m$. The increase in frequency from $f_s$ to $f_n$ is accompanied by a further acceleration of the motor 10.

The commutation frequency increases from zero to $f_m$ between time zero and $t_s$, and from $f_s$ to $f_n$ between $t_s$ and $t_n$. On the other hand, the controlled voltages supplied to the inverters 4,7 increase continuously from the initial value $U_o$ to a maximum value $U_n$ between time zero and $t_n$. The slopes of these frequency and voltage lines between time zero and $t_n$ are functions of the required dynamic torque of the motor 10 which is previously known and can be fed into the controller 9 via the keyboard 8 or a computer regulating the motor 10 as part of a system.

The commutation frequency and voltage are maintained constant at $f_n$ and $U_n$, respectively, for a time interval $t_w$ following $t_n$. During the time interval $t_w$, the motor 10 operates at a constant speed and may perform several revolutions in order to move a load through a predetermined distance.

At time $t_n+t_w$, a gradual reduction in the commutation frequency is initiated. Likewise, the controlled voltages supplied to the inverters 4,7 begin to be reduced at time $t_n+t_w$. The commutation frequency is reduced from $f_n$ to $f_s$ between time $t_n+t_w$ and time $t_m$. The reduction in commutation frequency is accompanied by an initial deceleration of the motor 10.

Once the commutation frequency has reached $f_s$, commutation of the non-commutating inverter 4 or 7 is restarted at a commutation frequency of $f_m$. Simultaneously, the commutation frequency of the other inverter 7 or 4 is increased from $f_s$ to $f_m$. The restarting of commutation and the increase in frequency from $f_s$ to $f_m$ are carried out at time $t_m$. The angular velocity of the motor 10 remains the same during these operations. However, the motor 10 now once more begins to operate as a stepping motor.

Beyond time $t_m$, the commutation frequency is again reduced gradually to further decelerate the motor 10. The reduction in commutation frequency is continued until the load driven by the motor 10 has been brought into the required position. Commutation of the inverters 4,7 is then stopped so that the motor 10 no longer rotates. Although the commutation frequency is reduced to zero once the load is in its required position, the controller 9 prevents the voltages of the inverters 4,7 from going to zero. Instead, the controller 9 insures that the voltages of the inverters 4,7 do not fall below the value $U_o$ which is required for the motor 10 to produce a holding torque for the load. The voltages supplied to the inverters 4,7 decrease linearly and continuously from the maximum value $U_n$ to the value $U_o$ between the time $t_n+t_w$ and the time at which the load reaches its required position.

Pulse width modulation of the pulses responsible for commutation of the inverters 4,7 may also be employed for the purpose of regulating the voltages applied to the rotor and stator of the motor 10 so that these voltages are proportional to the angular velocity of the motor 10.

An important feature of the motor according to the invention resides in that the windings of the rotor and stator have different numbers of phases. This allows the motor to operate as a stepping motor having high resolution, that is, a stepping motor capable of performing a large number of steps per revolution. Moreover, different numbers of phases for the windings of the rotor and stator make it possible for the motor to develop high torque. The motor of the invention is further highly versatile and is able to operate as a variable speed induction motor and a variable speed synchronous motor as well as a stepping motor.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the contribution to the art set forth herein and, therefore, such adaptations should and are intended to be comprehended within the meaning and range of equivalence of the appended claims.

What is claimed is:

1. A method of operating an electric motor having a rotor and a stator, comprising the steps of supplying said rotor with a first current from a first current source having means defining a first maximum number of phases, said rotor being provided with said first maximum number of phase windings, and said first phase windings constituting the sole phase windings on said rotor and each being connectible to and disconnectible from a respective phase of said first source; and supplying said stator with a second current from a second current source having means defining a second maximum number of phases, said second maximum number being different from said first maximum number, and said stator being provided with said second maximum number of second phase windings, said second phase windings constituting the sole phase windings on said stator and each being connectible to and disconnectible from a respective phase of said second source, the supplying steps being performed so that said first source has a first number of excited phases and said second source has a second number of excited, phases different from the first number of excited phases, and the supplying steps inducing rotation of said rotor, the supplying steps including connecting all of said first phase windings to said first source so as to produce a first magnetic field and simultaneously connecting all but one of said second phase windings to said second source so as to produce a second magnetic field which, if out of alignment with said first magnetic field, becomes aligned therewith due to rotation of said rotor, the supplying steps further including disconnecting one of said first phase windings from said first source so that said first magnetic field rotates through a first angle and simultaneously connecting said one second phase winding to said second source so that said second magnetic field rotates through a second angle which differs from said first angle due to the difference between said first maximum number and said second maximum number, said one first phase winding and the polarity of the current in said one second phase winding being selected in such a manner as to cause said magnetic fields to rotate in the same sense and to minimize the angles of rotation of said magnetic fields.

2. The method of claim 1, wherein the supplying steps are performed in such a manner that said first and second numbers of excited phases differ by one.

3. The method of claim 1, said first source including means for producing a first current frequency and said second source including means for producing a second current frequency; and wherein the supplying steps are performed in such a manner that the ratio of the frequency of said first current to the frequency of said second current is inversely proportional to the ratio of said first maximum number to said second maximum number.

4. The method of claim 1, further comprising the steps of changing the polarities of the phases of said first source; and changing the polarities of the phases of said second source.

5. The method of claim 1, further comprising the step of maintaining the voltages of said currents substantially proportional to the rotational speed of said rotor.

* * * * *